2,914,513

QUATERNIZED AQUEOUS-DISPERSIBLE RESINOUS COMPOSITION

John H. Daniel, Jr., Old Greenwich, Conn., assignor to American Cyanamid Company, New York, N.Y., a corporation of Maine No Drawing. Application January 30, 1956
Serial No. 562,032

6 Claims. (Cl. 260—85.7)

This invention relates to aqueous-dispersible copolymers. More particularly, this invention is directed to novel aqueous-dispersible copolymeric compositions obtained by treating a copolymer, derived from vinyl esters and vinyl haloesters, and thereafter reacting the copolymer with a tertiary amine to form quaternary salts.

The linear chain copolymers of the invention are thermoplastic resinous polymerization products of vinyl esters of aliphatic and aromatic acids containing from 2 to 18 carbon atoms and short chain vinyl esters of $\alpha$-halogenated acids. These are essentially the type of monomers used in practicing the invention, but it will be understood that other copolymerizable compounds may also be present in minor amounts up to 15% to 20% of the weight of the copolymer in some cases.

The vinyl ester monomers which may be employed are those containing from 4 to 20 carbons atoms, i.e., an ester formed from an organic acid of 2 to 18 carbon atoms and the vinyl group. Monomers of this group are represented by the general formula

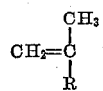

wherein "R" is an acyloxy group, i.e., $R^1COO$- group in which "$R^1$" is an alkyl group of 1 to 17 carbon atoms. Examples of monomers falling in this group are vinyl formate, vinyl acetate, vinyl propionate, vinyl butyrate, vinyl caproate, vinyl caprylate, vinyl decanoate, vinyl laurate, vinyl stearate, and the like.

The vinyl $\alpha$-haloester monomers which may be used are those derived from short chain $\alpha$-halogenated acids having 2 to 4 carbon atoms. For example, vinyl $\alpha$-chloroacetate, vinyl $\alpha$-bromoacetate, vinyl $\alpha$-iodoacetates; vinyl $\alpha$-chloropropionate, vinyl $\alpha$-bromopropionate, and vinyl $\alpha$-iodopropionate; vinyl $\alpha$-chlorobutyrates, vinyl $\alpha$-bromobutyrates, and vinyl $\alpha$-iodobutyrates.

The ratio of vinyl ester monomer to vinyl $\alpha$-haloester monomer is preferably in amounts between 50% and 99% by weight of the former and between 1% and 50% by weight of the latter.

The copolymerization reaction can be carried out by any of the procedures known to be effective in polymerizing vinyl compounds. Thus thermal or ultraviolet light polymerization may be employed. Preferably a small quantity, on the order of 0.1% to 2%, based on the weight of the monomers, of a polymerization initiator, such as azobisiso-butyronitrile, benzoyl peroxide, cumene hydroperoxide, pinane hydroperoxide, and the like, is added, after which the reaction mixture is heated at temperatures of about 50° C. to 150° C. until the copolymerization has been carried to the desired extent. Bulk polymerization procedures may be used in which the reagents are simply heated together in a closed vessel; or the polymerization can be carried out in an organic solvent, such as dioxane, toluene, or other aromatic hydrocarbon solvent. Emulsion polymerization procedures may also be used, if desired, for example, by emulsifying a mixture of the monomers in water containing a suitable emulsifying agent.

The copolymers used in practicing the invention are thermoplastic resins which are insoluble in water and therefore must be solubilized so that they can be usefully employed in aqueous solutions. The resins of the invention are rendered aqueous-dispersible, i.e., solubilized, by converting part or all of the copolymers into polymeric quaternary salts, thereby imparting hydrophilic properties to the polymers. The agents which are employed in making the quaternary salts for the purpose of imparting hydrophilic properties to the copolymers are the tertiary amines. Tertiary amines which are particularly suitable are those having short chain aliphatic substituents on the tertiary nitrogen, such as methyl-, ethyl-, and propyl-tertiary amines and tertiary amines containing mixtures of these radicals; those containing hydroxy ethyl and $\alpha$-hydroxy propyl radicals, such as triethanolamine and tripropanolamine; and those in which the tertiary nitrogen forms part of an aromatic heterocyclic ring, such as pyridine, substituted pyridines, and quinoline.

Depending on the specific application, copolymers in which as little as about 20% or even less of the basic nitrogen groups are quaternized may possess the requisite hydrophilic properties. From this minimum, the degree of quaternization can be increased to as much as 90% to 100%, although the time required and the high proportion of tertiary amine necessary may render the making of compounds having these higher values impractical.

Obviously, blends of the copolymers may be made and reacted with the same quaternizing agent. By aqueous-dispersible compositions is intended compositions soluble not only in water but in mixtures of water and water-miscible organic solvents. Aqueous solvents include not only water alone, but also water containing minor amount of a water-miscible organic solvent, such as dioxane, dimethyl formamide, monobutyl ether of ethylene glycol, monoethyl ether of ethylene glycol, or various alcohols or acetone. From a practical standpoint, it is generally more desirable to dissolve the polymer salt in a mixture of water and water-miscible organic solvent before adding additional water to dilute the mixture further. The addition of small amounts of water-miscible organic solvent does not interfere with the use of these copolymers and generally improves solubility in water. Frequently by adding these small amounts of solvents, the dispersibility in aqueous solvents of the copolymers of the invention is substantially facilitated in comparison to the dispersibility if the water-miscible organic solvent were omitted.

The presence of other water-soluble material in the aqueous solution of the salts of the copolymers is not excluded. For example, cooked starch may be employed to further enhance the properties which are imparted by the resin without losing any advantages afforded by the copolymers of the invention.

The molecular weights of the copolymers are not critically important, as aqueous-dispersible thermoplastic resins may be obtained over a wide range of molecular weight polymers. The more useful properties are obtained when the copolymers have attained molecular weights of at least 10,000, although it will be understood that the resins produced by the above-described processes ordinarily have molecular weights substantially higher than this minimum and usually within the range of about 50,000 to 500,000 or higher.

It will be seen, therefore, that the linear carbon chain polymers used in practicing the invention are copolymers of (a) vinyl esters and (b) vinyl haloesters having cationic properties and capabilities of imparting cationic properties to surfaces upon which the copolymer is applied. All or part of the halogen groups are thereafter converted into basic nitrogen salt groups by forming quaternary salts of the copolymers with tertiary amines.

Because of their dispersibility in aqueous solutions, these quaternary polymers can be economically applied to surfaces. They have been found to confer unusual surface properties to substrates to which they have been applied. In addition to their use with cellulosic bodies, the resins may be applied to textiles and to glass and metal surfaces to improve the surface characteristics of these materials as well as increasing adhesion to subsequently applied topcoats.

Surfaces so treated are rendered cationic. Cationically charged surfaces afford various advantages. For example, when cellulosic textiles are treated, the fiber is animalized, thereby rendering it readily amenable to dyeing with conventional acid dyes. In the absence of treatment with the cationic resins of the invention, this class of dyes could not be employed.

In order that the present invention may be more fully understood, the following examples are set forth for purposes of illustration only, and any specific enumeration of details should not be interpreted as a limitation, except as expressed in the appended claims.

In the examples which follow, the parts expressed are parts by weight, unless otherwise expressly stated.

*Example 1*

Into a suitable reaction vessel suitably equipped with stirrer, condenser, inlet and outlet lines, etc., are charged 18 parts vinyl chloroacetate, 68.8 parts vinyl acetate (mol ratio 1:5.3, respectively), 1.29 parts of benzoyl peroxide and 70 parts of benzene. The charge is then refluxed for 24 hours. 20 parts of the copolymer solution is evaporated to dryness first at atmospheric pressure, then at 120° under vacuum. 10.5 parts remain. To this is added 2.86 parts of pyridine and 40 parts of toluene. The mixture is heated on steam bath and then allowed to evaporate to a pasty mass. 51.8 parts of dioxane is then added and dissolved by warming. The solvent is stripped off and the residue dissolved in 453 parts of 50% isopropanol. Water is then added to dilute to the desired concentration.

*Example 2*

A vinyl stearate-vinyl chloroacetate copolymer is prepared by a solution technique by reacting together the following: 31 parts vinyl stearate, 12 parts vinyl chloroacetate (1:1 mol ratio), 0.26 part benzoyl peroxide, and 36 parts benzene. The charge is then refluxed for 6½ hours, after which time the polymer is isolated by adding the charge to methanol. 87.2% of the charged monomers are polymerized.

The pyridine quaternary is then prepared by heating the polymer with pyridine in dioxane.

*Example 3*

A copolymer from equal parts by weight of vinyl stearate and vinyl chloroacetate is made as follows: 20 parts of vinyl stearate and 20 parts of vinyl chloroacetate are dissolved in 36 parts of benzene. 0.26 parts of benzoyl peroxide initiator is added, and the solution is heated at reflux for 19 hours. The copolymer is precipitated by adding to a large volume of methanol, collecting the copolymer and washing with acetone. After the copolymer is dried under vacuum at 40° C., 34 parts of a white powdery product is obtained.

Preparation of the quaternary salt from this copolymer is accomplished by reacting with pyridine. 5.0 parts of copolymer, 3.30 parts of pyridine, and 15.7 parts of dioxane are mixed to give a solution and then reacted for two hours at 80° C. The resulting quaternary nitrogen salt is stripped of solvent and the solids are vacuum dried at 40° C. 6.5 grams of dried product is obtained. Analysis of this material for total ionized chloride shows 8.48%. Theoretical chloride for the 100% quaternary, assuming a 50% to 50% composition for the copolymer, is 11.1%. This shows that a high percentage of the chloride is reacted to form a quaternary salt.

*Example 4*

To copolymers of vinyl stearate-vinyl chloroacetate in respective weight ratios of 50% to 50% and 85% to 15% are prepared and purified, and pyridine quaternaries of these copolymers are then prepared as described in the previous examples. The 85 to 15 quaternary is substantially less soluble in 50% aqueous isopropanol than the 50 to 50 quaternary, which is readily soluble. However, blends of the 85 to 15 and 50 to 50 quaternaries in the ratios of 3:1 and 2:1 have good dispersibility.

*Example 5*

Employing the monomers and procedure of Example 4, an equimolar vinyl stearate-vinyl chloroacetate copolymer is made aqueous-dispersible using triethylamine as quaternizing agent in place of pyridine.

The solubility of the salts of the invention in aqueous media of the salt will vary depending on the specific monomers employed. A judicious section of the monomers and amounts of each of the monomers will give the solubility the best suited for the particular use to which the salt will be applied.

It will be apparent that various modifications are possible within the scope of the instant invention, and any enumeration of specific details is not intended to limit the invention, except as defined in the appended claims.

I claim:

1. An aqueous-dispersible linear chain cationic copolymer obtained by copolymerizing (1) between about 50% and 99% by weight of vinyl acetate and (2) between 1% and 50% by weight of a polymerizable vinyl α-haloester monomer containing an alkyl chain of from 2 to 4 carbon atoms followed by heating the copolymer in a water-miscible organic solvent with a tertiary amine such that at least about 20% of the halogen groups of the resulting copolymeric product are converted to quaternary nitrogen groups, thereby rendering the copolymer aqueous-dispersible.

2. An aqueous-dispersible linear chain cationic copolymer obtained by copolymerizing (1) between 50% and 99% by weight of vinyl acetate and (2) between 1% and 50% by weight of vinyl chloroacetate, followed by heating the copolymer in a water-miscible organic solvent with a tertiary amine such that at least about 20% of the halogen groups of the resulting copolymeric product are converted to quaternary nitrogen groups, thereby rendering the copolymer aqueous-dispersible.

3. An aqueous-dispersible linear chain cationic copolymer obtained by copolymerizing (1) between about 50% and 99% by weight of vinyl stearate and (2) between 1% and 50% by weight of vinyl chloroacetate, followed by heating the copolymer in a water-miscible organic solvent with a tertiary amine such that at least about 20% of the halogen groups of the resulting copolymeric product are converted to quaternary nitrogen groups, thereby rendering the copolymer aqueous-dispersible.

4. An aqueous-dispersible linear chain cationic copolymer obtained by copolymerizing (1) between 50% and 99% by weight of vinyl stearate and (2) between 1% and 50% by weight of vinyl chloroacetate, followed by heating the copolymer in a water-miscible organic solvent together with pyridine such that at least about 20% of the halogen groups of the resulting copolymeric product are converted to quaternary nitrogen groups, thereby rendering the copolymer aqueous-dispersible.

5. An aqueous-dispersible linear chain cationic copolymer obtained by copolymerizing (1) between 50% and 99% by weight of vinyl acetate and (2) between 1% and 50% by weight of vinyl chloroacetate, followed by heating the copolymer in a water-miscible organic solvent together with pyridine such that at least about 20% of the halogen groups of the resulting copolymeric product are converted to quaternary nitrogen groups, thereby rendering the copolymer aqueous-dispersible.

6. An aqueous-dispersible linear chain cationic copolymer obtained by copolymerizing (1) between about 50% and 99% by weight of a monomer selected from the group consisting of polymerizable vinyl esters having the formula

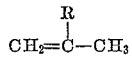

wherein "R" is a $R^1COO-$ group in which "$R^1$" is an alkyl group of 1-17 carbon atoms and (2) between 1% and 50% by weight of a monomer selected from the group of polymerizable vinyl α-halo esters of short chain α-halo carboxylic acids of from 2 to 4 carbon atoms, followed by heating the copolymer in a water-miscible organic solvent with a tertiary amine such that at least about 20% of the halogen groups of the resulting copolymeric product are converted to quaternary nitrogen groups, thereby rendering the copolymer aqueous-dispersible.

References Cited in the file of this patent
UNITED STATES PATENTS 2,118,864   Reppe et al. _____ May 31, 1938

FOREIGN PATENTS 395,478   Great Britain _____ July 20, 1933

OTHER REFERENCES

Ham et al.: Industrial and Engineering Chemistry, vol. 45, No. 10, pages 2320–2326. (Copy in Sci. Lib.)

Schildnecht: Vinyl and Related Polymers (John Wiley & Sons, 1952), page 370. (Copy in Sci. Lib.)

UNITED STATES PATENT OFFICE
CERTIFICATE OF CORRECTION

Patent No. 2,914,513                        November 24, 1959

John H. Daniel, Jr.

It is hereby certified that error appears in the printed specification of the above numbered patent requiring correction and that the said Letters Patent should read as corrected below.

Column 1, lines 35 to 38, the formula should appear as shown below instead of as in the patent:

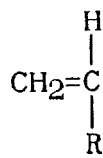

column 5, lines 9 to 11, the formula should appear as shown below instead of as in the patent:

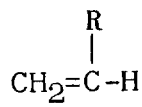

Signed and sealed this 16th day of August 1960.

(SEAL)
Attest:

KARL H. AXLINE                              ROBERT C. WATSON
Attesting Officer                      Commissioner of Patents